US009648411B2

(12) United States Patent
Funakoshi

(10) Patent No.: US 9,648,411 B2
(45) Date of Patent: May 9, 2017

(54) SOUND PROCESSING APPARATUS AND SOUND PROCESSING METHOD

(71) Applicant: CANON KABUSHIKI KAISHA, Tokyo (JP)

(72) Inventor: Masanobu Funakoshi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/598,323

(22) Filed: Jan. 16, 2015

(65) Prior Publication Data

US 2015/0208167 A1 Jul. 23, 2015

(30) Foreign Application Priority Data

Jan. 21, 2014 (JP) ................................ 2014-008859

(51) Int. Cl.
*G10L 21/00* (2013.01)
*G06F 17/00* (2006.01)
(Continued)

(52) U.S. Cl.
CPC ............ *H04R 1/1083* (2013.01); *G10L 19/00* (2013.01); *G10L 21/02* (2013.01);
(Continued)

(58) Field of Classification Search
CPC ............. G10L 21/0208; G10L 21/0232; G10L 21/0308; G10L 25/18; G10L 21/02;
(Continued)

(56) References Cited

U.S. PATENT DOCUMENTS 4,630,304 A * 12/1986 Borth ................. G10K 11/1782 381/317
2005/0021333 A1* 1/2005 Smaragdis .............. G10L 25/48 704/236

(Continued)

FOREIGN PATENT DOCUMENTS

JP 2009-128906 A 6/2009
JP 2012-022120 A 2/2012
JP 2012022120 * 2/2012 ............ G10L 21/02

*Primary Examiner* — Xu Mei
*Assistant Examiner* — Ubachukwu Odunukwe
(74) *Attorney, Agent, or Firm* — Carter, DeLuca, Farrell & Schmidt, LLP

(57) ABSTRACT

An audio matrix formed from absolute amplitude values of coefficients obtained by frequency-transforming an audio signal is generated. The audio matrix is factorized into a basis spectrum and activity matrices. Bases in the basis spectrum matrix are classified into bases concerning a target sound and bases concerning noise. Bases in the activity matrix are classified into bases concerning the target sound and bases concerning the noise. Bases concerning the target sound are obtained from the bases concerning the noise classified from the basis spectrum matrix. A matrix including frequency amplitude values of the target sound is obtained using the bases concerning the target sound classified from the basis spectrum matrix, the bases concerning the target sound and noise classified from the activity matrix, and the obtained bases. The audio signal of the target sound is generated using the matrix.

11 Claims, 7 Drawing Sheets

(51) Int. Cl.
*H04R 1/10* (2006.01)
*G10L 19/00* (2013.01)
*G10L 21/02* (2013.01)

(52) U.S. Cl.
CPC .... *H04R 2225/39* (2013.01); *H04R 2227/001* (2013.01); *H04R 2410/07* (2013.01)

(58) Field of Classification Search
CPC ........... G10L 21/06; G10L 2021/02166; G10L 25/84; G10L 21/0216; G10L 15/20; G10L 15/00; G10L 15/28; G10L 21/00; G10L 2021/02165; G10L 2021/0135; G10L 25/90; G10L 21/013; G10L 19/26; G10L 11/04; G10L 15/12; G10L 21/03; G10L 19/02; G10L 19/00; G10K 21/0272; G10K 11/16; G10K 15/00; H04R 1/40; H04R 3/00; H04R 29/00; H04R 3/005; H04R 1/108; H04R 3/04; H04R 25/50; H04S 7/305; H04S 7/00; H04S 5/02; H04S 7/30; H04S 1/002; G01H 7/00; G01H 3/00; G01H 17/00; G01H 1/20; G01H 2210/066; G01H 3/125; G01H 1/08; G01H 2250/031; G01S 3/8083; H03G 3/00; H03G 5/00
USPC ........ 700/94; 381/92, 94.2, 94.3, 94.1, 94.7, 381/56, 57, 59, 58, 103, 71.1, 71.11, 381/71.14, 94.9, 119, 120, 122, 97; 704/205, 233, 226, 227, 228, 204, 500, 704/E21.002, 212, 206, 208, 236, 207, 704/203, 225, E11.001, E21.01; 702/190; 382/173; 345/600; 84/616, 621, 623, 84/654, 698; 340/856.3
See application file for complete search history.

(56) References Cited

U.S. PATENT DOCUMENTS

2005/0288923 A1* 12/2005 Kok .................... G10L 21/0208 704/226
2008/0215651 A1* 9/2008 Sawada ................ G06K 9/6245 708/205
2010/0174389 A1* 7/2010 Blouet .................. G10L 21/028 700/94
2010/0232619 A1* 9/2010 Uhle ................... G10L 21/0364 381/80
2012/0022864 A1* 1/2012 Leman .................... G10L 25/00 704/233
2012/0136655 A1* 5/2012 Yamabe .................. G10L 25/90 704/207
2013/0035933 A1* 2/2013 Hirohata ................. G10L 15/20 704/206

* cited by examiner

SOUND PROCESSING APPARATUS AND SOUND PROCESSING METHOD

BACKGROUND OF THE INVENTION

Field of the Invention

The present invention relates to a technique of picking up a target sound while suppressing noise.

Description of the Related Art

The recent proliferation of camcorders, cameras, smartphones, and the like has allowed easy video shooting. Portable audio recorders capable of recording high-quality sounds have also become widespread. This increases the opportunities of recording or picking up an ambient sound or a sound of a target object both indoors and outdoors whether a video is included or not.

If noise other than the target sound, for example the operating sound of an air conditioner or a PC indoors, or wind noise (wind sound) outdoors, is mixed in such a sound pickup signal, it grates on the ear and also impedes voice recognition. Hence, it is conventionally important to suppress unnecessary noise in the sound pickup signal.

Some techniques of suppressing noise in an audio signal use non-negative matrix factorization (NMF). In these techniques, short-time Fourier transform is performed for an audio signal, and a matrix (to be referred to as an audio matrix hereinafter) in which the absolute amplitude values of coefficients are arranged in time series is factorized into a basis spectrum matrix and an activity matrix by non-negative matrix factorization. Based on an assumption that the matrices can be separated into components derived from the sound sources, the matrices are classified into a submatrix concerning the target sound and a submatrix concerning noise. A target sound reconstruction signal without noise is reconstructed using a target sound basis spectrum matrix that is a basis spectrum submatrix concerning the target sound and a target sound activity submatrix that is an activity submatrix concerning the target sound. Note that an audio matrix colored by values and displayed as a map is generally called a spectrogram.

For example, in patent literature 1 (Japanese Patent Laid-Open No. 2009-128906), a target sound and noise are prepared independently of an audio signal that is a noise removal target and learned in advance, thereby obtaining a teacher basis spectrum matrix and a teacher activity matrix for each of the target sound and noise. Then, using the statistic information of the teacher basis spectrum matrices and the teacher activity matrices, a matrix obtained by time-frequency conversion of the audio signal is factorized to obtain a target sound reconstruction signal.

In patent literature 2 (Japanese Patent Laid-Open No. 2012-22120), two matrices obtained by time-frequency conversion of audio signals of two channels undergo non-negative matrix factorization. Out of basis spectra included in each column of the basis matrix of each channel, basis spectra having high correlation between the channels are defined as noise basis spectra, and the rest is defined as target sound basis spectra. A target sound reconstruction signal is generated using a target sound basis matrix formed from the target sound basis spectra and a target sound activity matrix corresponding to it.

In the conventional techniques of separating sound sources using NMF, the components of each basis spectrum are not necessarily derived from the components of only one sound source, and the components of a plurality of sound sources may mix. Hence, when noise is suppressed by NMF, the reconstructed target sound degrades because of target sound components included in part of the noise basis spectrum matrix.

For example, the technique disclosed in patent literature 1 attempts to strictly separate sound sources by learning basis spectra and activities in advance. However, if the target sound components are included in the noise basis spectrum matrix as the result of separation, it cannot be corrected. There exists a related art that attempts to extract target sound components from a noise signal separated and reconstructed by NMF.

For example, the technique disclosed in patent literature 2 extracts residual components from a reconstructed noise signal based on the harmonic structure of a target sound signal reconstructed by NMF. However, extraction is difficult by this method when the target sound signal has no harmonic structure.

SUMMARY OF THE INVENTION

The present invention has been made in consideration of the above-described problems, and provides a technique of more accurately reconstructing a target sound from an audio signal that is a signal of an environment sound including the target sound.

According to the first aspect of the present invention, there is provided a sound processing apparatus comprising: a unit configured to generate an audio matrix formed from absolute amplitude values of coefficients obtained by frequency-transforming an audio signal that is a signal of an environment sound including a target sound; a unit configured to perform non-negative matrix factorization for the audio matrix, thereby factorizing the audio matrix into a basis spectrum matrix and an activity matrix; a unit configured to classify bases included in the basis spectrum matrix into bases concerning the target sound and bases concerning noise, and classify bases included in the activity matrix into bases concerning the target sound and bases concerning the noise; a first calculation unit configured to obtain bases concerning the target sound from the bases concerning the noise classified from the basis spectrum matrix; a second calculation unit configured to obtain a matrix including frequency amplitude values of the target sound as elements using the bases concerning the target sound classified from the basis spectrum matrix, the bases concerning the target sound and the bases concerning the noise classified from the activity matrix, and the bases concerning the target sound obtained by the first calculation unit; and a generation unit configured to generate the audio signal of the target sound using the matrix obtained by the second calculation unit.

According to the second aspect of the present invention, there is provided a sound processing apparatus comprising: a unit configured to generate an audio matrix formed from absolute amplitude values of coefficients obtained by frequency-transforming an audio signal that is a signal of an environment sound including a target sound; a unit configured to perform non-negative matrix factorization for the audio matrix, thereby factorizing the audio matrix into a basis spectrum matrix and an activity matrix; a unit configured to classify bases included in the basis spectrum matrix into bases concerning the target sound and bases concerning noise, and classify bases included in the activity matrix into bases concerning the target sound and bases concerning the noise; a first calculation unit configured to obtain bases for which components of a high frequency band of the bases are suppressed from the bases concerning the noise classified from the basis spectrum matrix; a second calculation unit configured to obtain a matrix including frequency amplitude values of the noise as elements using the bases concerning the noise classified from the activity matrix and the bases obtained by the first calculation unit; a third calculation unit configured to obtain a matrix including the frequency amplitude values of the target sound as elements using the audio matrix and the matrix obtained by the second calculation unit; and a generation unit configured to generate the audio signal of the target sound using the matrix obtained by the third calculation unit.

According to the third aspect of the present invention, there is provided a sound processing method performed by a sound processing apparatus, comprising: a step of generating an audio matrix formed from absolute amplitude values of coefficients obtained by frequency-transforming an audio signal that is a signal of an environment sound including a target sound; a step of performing non-negative matrix factorization for the audio matrix, thereby factorizing the audio matrix into a basis spectrum matrix and an activity matrix; a step of classifying bases included in the basis spectrum matrix into bases concerning the target sound and bases concerning noise, and classifying bases included in the activity matrix into bases concerning the target sound and bases concerning the noise; a first calculation step of obtaining bases concerning the target sound from the bases concerning the noise classified from the basis spectrum matrix; a second calculation step of obtaining a matrix including frequency amplitude values of the target sound as elements using the bases concerning the target sound classified from the basis spectrum matrix, the bases concerning the target sound and the bases concerning the noise classified from the activity matrix, and the bases concerning the target sound obtained in the first calculation step; and a generation step of generating the audio signal of the target sound using the matrix obtained in the second calculation step.

According to the fourth aspect of the present invention, there is provided a sound processing method performed by a sound processing apparatus, comprising: a step of generating an audio matrix formed from absolute amplitude values of coefficients obtained by frequency-transforming an audio signal that is a signal of an environment sound including a target sound; a step of performing non-negative matrix factorization for the audio matrix, thereby factorizing the audio matrix into a basis spectrum matrix and an activity matrix; a step of classifying bases included in the basis spectrum matrix into bases concerning the target sound and bases concerning noise, and classifying bases included in the activity matrix into bases concerning the target sound and bases concerning the noise; a first calculation step of obtaining bases for which components of a high frequency band of the bases are suppressed from the bases concerning the noise classified from the basis spectrum matrix; a second calculation step of obtaining a matrix including frequency amplitude values of the noise as elements using the bases concerning the noise classified from the activity matrix and the bases obtained in the first calculation step; a third calculation step of obtaining a matrix including the frequency amplitude values of the target sound as elements using the audio matrix and the matrix obtained in the second calculation step; and a generation step of generating the audio signal of the target sound using the matrix obtained in the third calculation step.

Further features of the present invention will become apparent from the following description of exemplary embodiments (with reference to the attached drawings).

DESCRIPTION OF THE EMBODIMENTS

Figure 1:
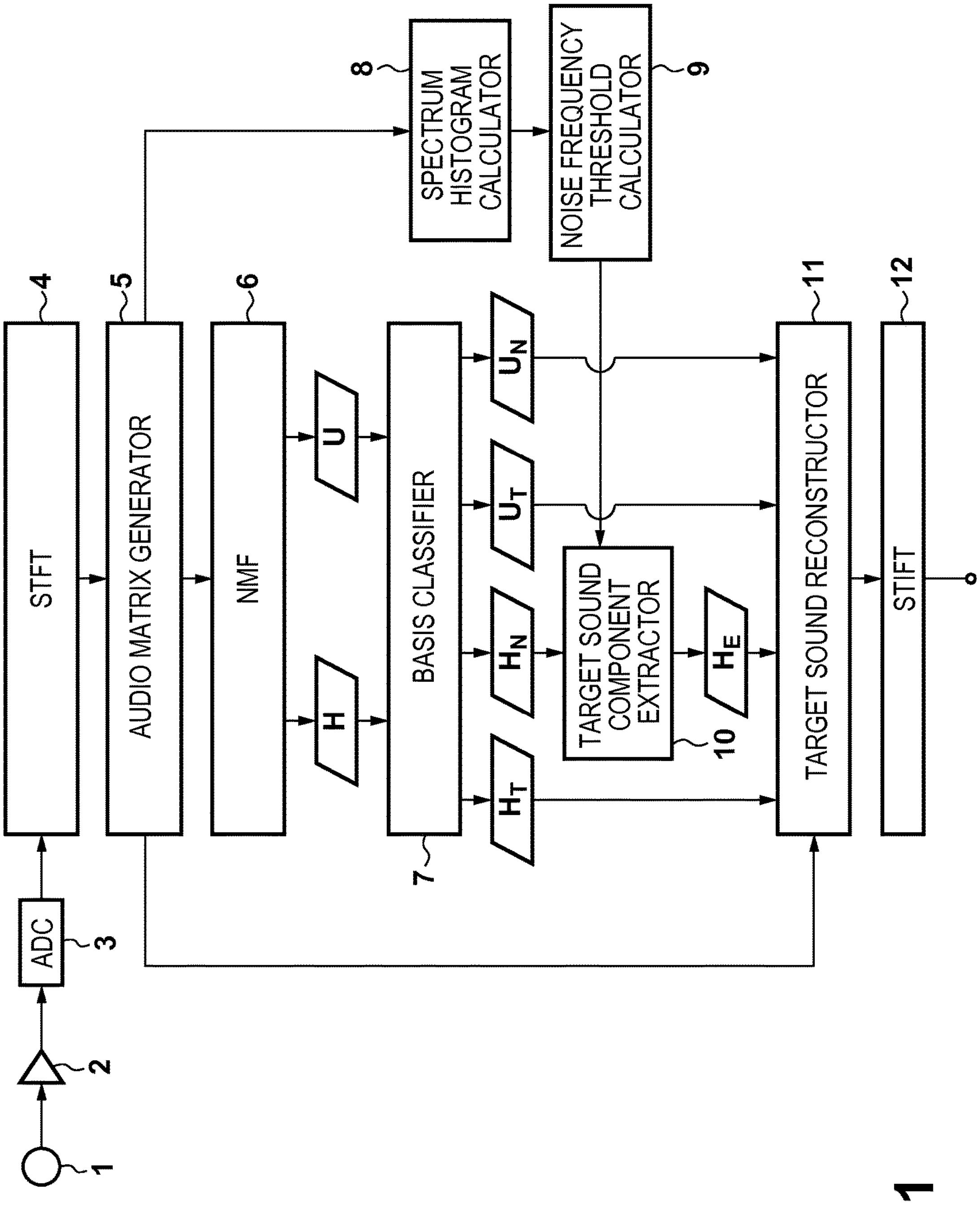
FIG. 1 is a block diagram showing an example of the functional arrangement of a sound processing apparatus.

The embodiments of the present invention will now be described with reference to the accompanying drawings. Note that the embodiments to be described below are examples of detailed implementation of the present invention or detailed examples of the arrangement described in the appended claims.

First Embodiment

In this embodiment, a sound processing technique of collecting an audio signal that is a signal of an environment sound including a target sound, accurately reconstructing the target sound from the collected audio signal, and outputting it will be described. An example of the functional arrangement of a sound processing apparatus according to this embodiment will be explained first with reference to the block diagram of FIG. 1.

A microphone unit 1 collects an environment sound including a target sound, converts the collected environment sound into an analog audio signal, and outputs it to a microphone amplifier 2. The microphone amplifier 2 amplifies the weak analog audio signal output from the microphone unit 1 and outputs it. An analog/digital converter (ADC) 3 converts the analog audio signal amplified by the microphone amplifier 2 into a digital audio signal, and outputs the converted digital audio signal as a sound pickup signal.

An STFT (Short-Time Fourier Transformer) 4 Fourier-transforms the sound pickup signal output from the ADC 3 for each predetermined frame length, and outputs a frequency domain signal (Fourier coefficient group) for each predetermined frame length.

An audio matrix generator 5 brings together the frequency domain signals (Fourier coefficient groups) output from the SIFT 4 in a predetermined time length and calculates the absolute amplitude value of each Fourier coefficient, thereby generating the audio matrix of the sound pickup signal. The audio matrix generator 5 also generates a phase matrix corresponding to the audio matrix.

An NMF (Non-negative Matrix Factorizer) 6 performs non-negative matrix factorization for the audio matrix generated by the audio matrix generator 5, factorizes the audio matrix into a basis spectrum matrix H and an activity matrix U, and outputs them.

A basis classifier 7 generates a matrix $H_T$ formed from bases concerning the target sound and a matrix $H_N$ formed from bases concerning noise from the basis spectrum matrix H output from the NMF 6. Similarly, the basis classifier 7 generates a matrix $U_T$ formed from bases concerning the target sound and a matrix $U_N$ formed from bases concerning noise from the activity matrix U output from the NMF 6.

A spectrum histogram calculator 8 adds the Fourier coefficient values of each row of the audio matrix generated by the audio matrix generator 5, thereby generating the histogram of each spectrum component of the audio matrix.

A noise frequency threshold calculator 9 calculates a noise frequency threshold that is an index used to determine noise components and target sound components in the matrix $H_N$ by referring to the histograms generated by the spectrum histogram calculator 8.

A target sound component extractor 10 extracts the target sound components from the matrix $H_N$ by referring to the noise frequency threshold obtained by the noise frequency threshold calculator 9, generates an extracted target sound basis spectrum matrix $H_E$ formed from the Fourier coefficients of the extracted target sound components, and outputs it.

Using the matrices $H_T$, $U_T$, $H_E$, and $U_N$, a target sound reconstructor 11 generates an accurate frequency domain signal of the target sound.

An STIFT (Short-Time Inverse Fourier Transformer) 12 performs inverse Fourier transform on a frame basis for the frequency domain signal of the target sound generated by the target sound reconstructor 11, and converts it into a time domain signal. The STIFT 12 outputs the converted time domain signal as an audio signal of the target sound.

A series of processes performed by the sound processing apparatus having the above-described arrangement to accurately reconstruct the target sound while suppressing noise included in the sound pickup signal will be described next with reference to FIG. 2 that illustrates the flowchart of the processing.

As described above, the microphone unit 1 collects an environment sound including a target sound, and converts the collected environment sound into an analog audio signal. The microphone amplifier 2 amplifies the weak analog audio signal output from the microphone unit 1 and outputs it. The analog/digital converter (ADC) 3 converts the analog audio signal amplified by the microphone amplifier 2 into a digital audio signal, and outputs the converted digital audio signal as a sound pickup signal.

In step S1, the STFT 4 cuts out a partial sound pickup signal (frame) having a predetermined frame length from the sound pickup signal output from the ADC 3. Here, the frame is cut out such that its first half overlaps the second half of the frame cut out previously.

In step S2, the SIFT 4 performs short-time Fourier transform for the frame cut out in step S1, thereby calculating the Fourier coefficient group of the frame. The audio matrix generator 5 calculates the absolute amplitude value of each Fourier coefficient obtained by the SIFT 4, and registers the calculated absolute amplitude values in columns (unregistered columns) of the audio matrix where no absolute amplitude values are registered yet. Note that all the columns of the audio matrix are unregistered columns in the initial state. That is, the Fourier coefficients are registered in the audio matrix such that each row of the audio matrix represents a frequency, and each column represents a time. The audio matrix generator 5 also registers the phases of the Fourier coefficients in a phase matrix having the same size as the audio matrix.

In step S3, the audio matrix generator 5 determines whether an unregistered column remains in the audio matrix, that is, whether an audio matrix in which Fourier coefficients of a predetermined time length are registered is completed.

Upon determining that the audio matrix is completed, the process advances to step S4. If the audio matrix is not completed yet, the process returns to step S1, and the process from step S1 is repeated for the next frame.

In step S4, the NMF 6 performs non-negative matrix factorization for the audio matrix generated by the audio matrix generator 5, thereby factorizing the audio matrix into the basis spectrum matrix H and the activity matrix U. Letting V be the audio matrix, a relationship given by $$V \approx HU \tag{1}$$

holds.

Each column of the basis spectrum matrix H is called a basis spectrum. Each row of the activity matrix U is called an activity. The basis spectrum of the ith column of the basis spectrum matrix H and the activity of the ith row of the activity matrix U are in a one-to-one correspondence. When the matrix product of the two matrices is calculated, an audio matrix can be obtained for each basis included in the audio matrix.

In step S5, the basis classifier 7 classifies the bases included in the basis spectrum matrix H into bases concerning the target sound and bases concerning noise, and generates the matrix $H_T$ formed from the bases concerning the target sound and the matrix $H_N$ formed from the bases concerning the noise. Similarly, the basis classifier 7 classifies the bases included in the activity matrix U into bases concerning the target sound and bases concerning noise, and generates the matrix $U_T$ formed from the bases concerning the target sound and the matrix $U_N$ formed from the bases concerning the noise.

There exist various detailed methods of classifying the bases, including a classifying method focusing on the characteristic of basis spectra and a classifying method focusing on the characteristic of activities. In this embodiment, assuming noise such as wind noise having a bias in the frequency characteristic, the bases are classified into bases concerning the target sound and bases concerning the noise by placing focus on the barycentric frequency of each basis spectrum. While noise concentrates to certain frequency components, a target sound such as a voice or music is generally considered to have components in a wide band. The bases can be classified using this characteristic. More specifically, the barycentric frequency of each basis spectrum included in the basis spectrum matrix is obtained, and both the basis spectra and the activities are sorted in the order of barycentric frequency, thereby classifying the bases. In case of wind noise, the components concentrate to a low band, and the bases have low barycentric frequencies. On the other hand, the components of the bases of a target sound are distributed in a higher band, and the barycentric frequencies are higher. Hence, when sorted in ascending order, the bases are arranged in descending order of noise level as the result of sorting. The bases concerning the target sound and the bases concerning the noise can also be classified by dividing them based on another criterion, for example, the SNR of a signal generated by reconstructing the classified bases, a predetermined frequency threshold, or the like.

In step S6, the spectrum histogram calculator 8 calculates the histogram of each spectrum component of the audio matrix generated by the audio matrix generator 5. The histogram of the spectrum component of each row can be generated by calculating the sum of Fourier coefficient values in each row of the audio matrix, as described above.

In step S7, the noise frequency threshold calculator 9 obtains the boundary portion between the frequency band of the target sound and the frequency band of the noise as a threshold (frequency threshold of noise components) using the histograms generated in step S6.

Consider the variation in the frequency components of the audio matrix. For example, in wind noise, the variation occurs at a predetermined rate in a low band. In the target sound, however, the frequency components sparsely disperse in a wide band. Hence, the histogram has a large value in the band of wind noise components or a small value in the band where the target sound components exist. That is, a step difference of values (histogram values) is formed on the histograms between the frequency band of the wind noise and that of the target sound components. The frequency threshold of noise components is decided by detecting the step difference. For example, a portion of step difference of a predetermined value or more is decided as the frequency threshold of noise components.

In step S8, the target sound component extractor 10 extracts the target sound components from the matrix $H_N$ using the threshold obtained in step S7, and generates the extracted target sound basis spectrum matrix $H_E$ formed from the Fourier coefficients of the extracted target sound components. Various methods are usable to execute the process of step S8. One of the methods will be described later for instance with reference to the flowcharts of FIGS. 3A and 3B.

In step S9, the target sound reconstructor 11 reconstructs an accurate frequency domain signal (audio matrix) of the target sound using the matrices $H_T$, $U_T$, and $U_N$ generated in step S5 and the extracted target sound basis spectrum matrix $H_E$ obtained in step S8. More specifically, an accurate audio matrix $V_T$ of the target sound is reconstructed by $$V_T=H_TU_T+H_EU_N \tag{2}$$

As indicated by equation (2), in this embodiment, the target sound components (matrix $H_E$) that are conventionally removed together with the noise components are also reconstructed as the target sound. It is therefore possible to reconstruct a more accurate target sound.

In step S10, the target sound reconstructor 11 applies the elements (phases) of the phase matrix generated in step S2 to the frequency amplitude values that are the elements of the audio matrix $V_T$ of the target sound generated in step S9, and converts the element of the audio matrix into Fourier coefficients including phase information.

In step S11, the STIFT 12 performs short-time inverse Fourier transform for each column of the audio matrix to which the phase matrix is applied in step S10, and adds obtained time domain signals while shifting the frame length by ½, thereby outputting the time signal of the reconstructed target sound. The output destination is not limited to a specific output destination. The signal may be stored in a memory as data, or converted into an analog signal and then output via a speaker as a sound.

Figure 2:
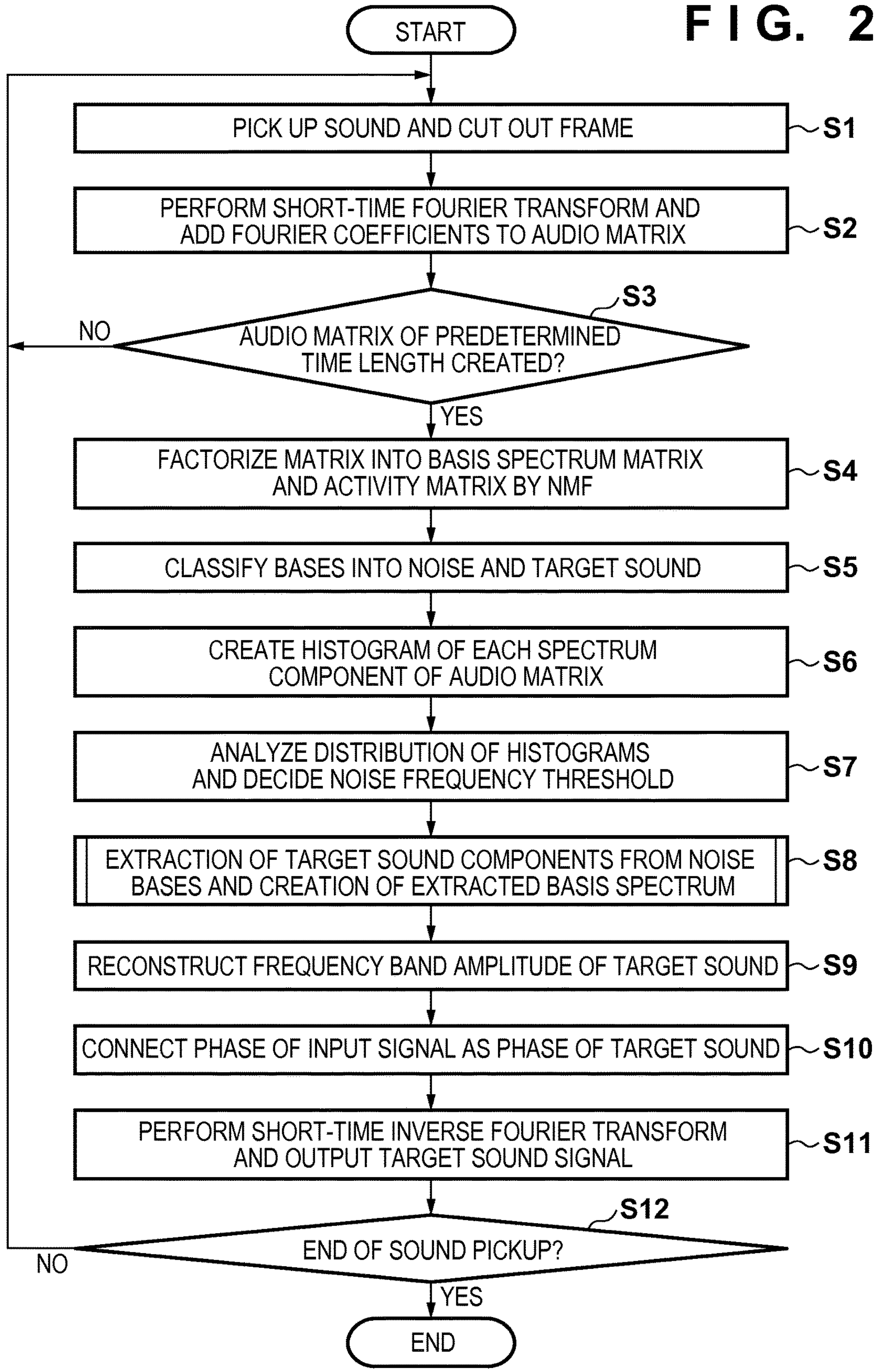
FIG. 2 is a flowchart of processing performed by the sound processing apparatus.

When the termination condition of the processing according to the flowchart of FIG. 2 is met by, for example, inputting a sound pickup end instruction to the apparatus, the processing ends via step S12. If the termination condition is not met, the process returns to step S1 via step S12.

Figure 3A:
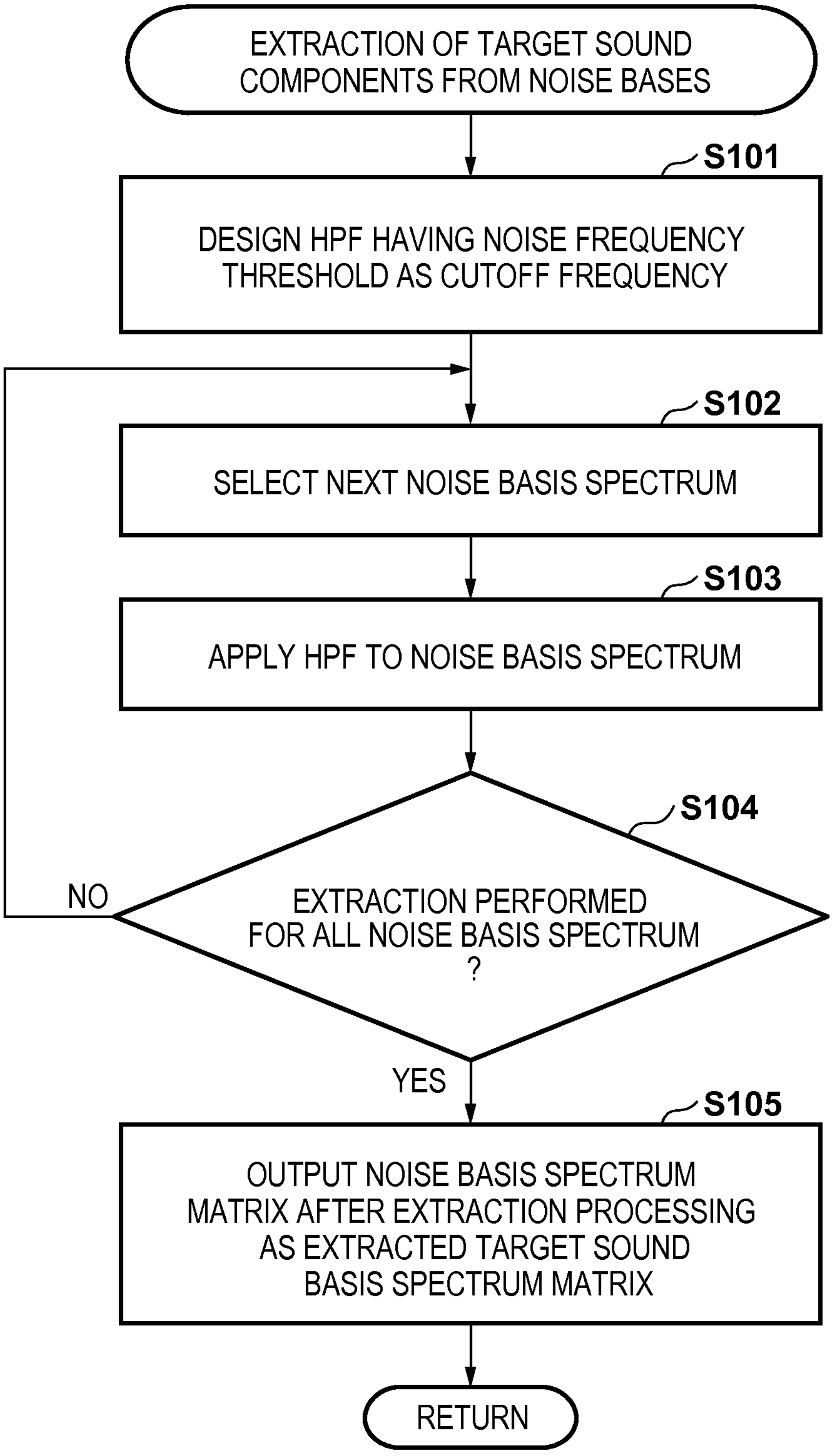
FIGS. 3A and 3B are flowcharts showing details of the process of step S8.
Figure 3B:
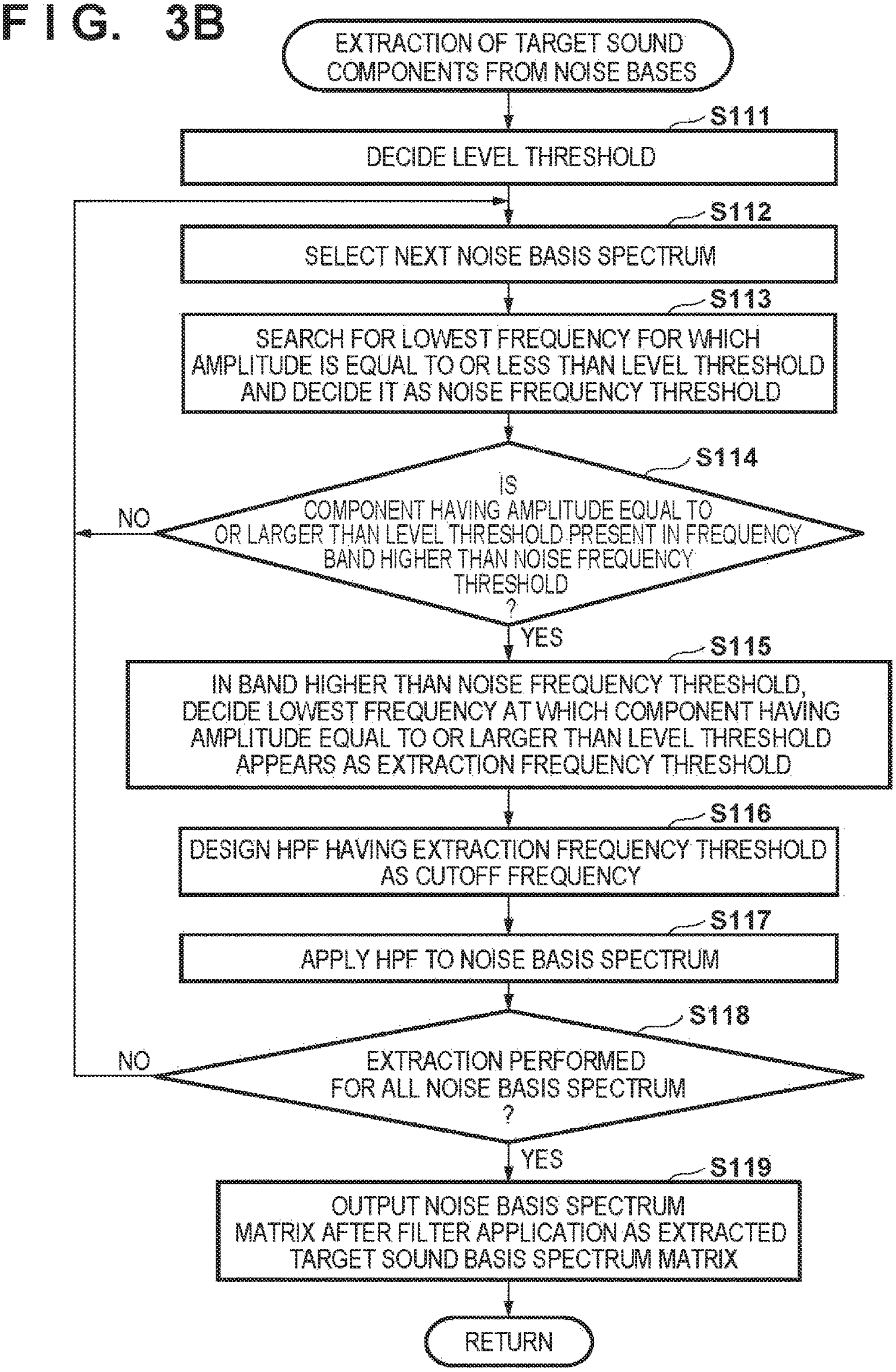

Details of the process of step S8 described above will be explained with reference to the flowcharts of FIGS. 3A and 3B. FIG. 3A shows the flowchart of processing of obtaining bases concerning the target sound from all bases included in the matrix $H_N$. FIG. 3B shows the flowchart of processing of obtaining bases concerning the target sound from bases including target sound components out of all bases included in the matrix $H_N$. Either of processing according to the flowchart shown in FIG. 3A and processing according to the flowchart shown in FIG. 3B is applicable to the process of step S8. Processing according to the flowchart of FIG. 3A will be described first.

In step S101, a high-pass filter (HPF) having the noise frequency threshold obtained in step S7 as the cutoff frequency is generated. At this time, the gain and Q value of the filter are generated using predetermined values. Note that the filter coefficients of the generated HPF are converted from the time domain into frequency domain coefficients having the same resolution as the bases included in the matrix $H_N$ and then converted into absolute amplitude values.

In step S102, a basis spectrum (noise basis spectrum) to be processed next is selected from the basis spectra included in the matrix $H_N$. In this embodiment, the basis spectrum of the leftmost column of the matrix $H_N$ is the first selection target, and that of the second column from the left end is the second selection target. The basis spectra of the columns are sequentially selected from the left end to the right end in the above way.

In step S103, the filter coefficients of the HPF generated in step S101 are convoluted in the frequency domain with respect to the noise basis spectrum selected in step S102. Here, the filter coefficients are the absolute values of amplitudes, that is, the weights of the frequency components. Hence, with this processing, the frequency components of the noise basis spectrum are weighted by the filter coefficients, respectively. As a result of this processing, components equal to or less than the noise frequency threshold are suppressed in the noise basis spectrum selected in step S102. Components of frequencies higher than the noise frequency threshold are consequently extracted.

In step S104, it is determined whether all basis spectra included in the matrix $H_N$ are selected, that is, whether the process of step S103 has been executed for all noise basis spectra included in the matrix $H_N$. Upon determining that all basis spectra are selected, the process advances to step S105. If an unselected basis spectrum remains, the process returns to step S102, and the process from then on is repeated for the unselected basis spectrum.

In step S105, the matrix $H_N$ whose basis spectra have undergone the above convolution is sent to the target sound reconstructor 11 as the extracted basis spectrum matrix $H_E$.

As described above, in the processing according to the flowchart of FIG. 3A, components of frequencies higher than the frequency threshold are evenly extracted from all noise basis spectrum columns, thereby extracting the target sound components. However, whether the target sound components are included in all noise bases is unknown. For this reason, in the processing according to the flowchart of FIG. 3A, wasteful processing may be performed consequently, and small noise other than the target sound components may be extracted. FIG. 3B illustrates processing of detecting whether the target sound is included in each noise basis spectrum and attempting to more accurately extract the target sound components in accordance with the situation. Note that when the processing according to the flowchart of FIG. 3B is executed, the processes of steps S6 and S7 are unnecessary.

In step S111, a level threshold that is an index used to determine whether the target sound components are included in the matrix $H_N$ is decided. For example, the maximum amplitude value out of the absolute amplitude values of the frequency components in the matrix $H_N$ is set as the criterion, and a value obtained by subtracting 50 dB from the value is decided as the level threshold. The method of deciding the level threshold is not limited to this, as a matter of course. In step S112, the same process as in step S102 is executed.

In step S113, the lowest frequency for which the amplitude of the noise basis spectrum selected in step S112 is equal to or less than the level threshold decided in step S111 is searched for and decided as the noise frequency threshold. Since a noise basis spectrum always includes noise components, a block of frequency components exists in the lower frequency region. In this process, the frequency at the boundary of the block is searched for, and components up to that frequency are handled as noise components.

In step S114, in the noise basis spectrum selected in step S112, a component having an amplitude equal to or larger than the level threshold decided in step S111 is searched for in a frequency band higher than the noise frequency threshold decided in step S113. If a component having an amplitude equal to or larger than the level threshold decided in step S111 exists as the result of the search, the process advances to step S115. If such a component does not exist, the noise basis spectrum is regarded as lacking the target sound components, and the process returns to step S112.

In step S115, the lowest frequency at which the component having an amplitude equal to or larger than the level threshold, which is found in step S114, appears is decided as an extraction frequency threshold. That is, in the processing according to the flowchart of FIG. 3B, the frequency band to be extracted as the target sound components is changed for each noise basis spectrum. This makes it possible to avoid extraction of wasteful information and accurately extract only the target sound components.

In step S116, a high-pass filter having the extraction frequency threshold decided in step S115 as the cutoff frequency is generated. As in step S101 described above, the gain and Q value of the filter are generated using predetermined values. The filter coefficients are converted from the time domain into frequency domain coefficients having the same resolution as the bases included in the matrix $H_N$ and then converted into absolute amplitude values. In steps S117, S118, and S119, the same processes as in steps S103, S104, and S105 are performed, respectively, and a description of these steps will be omitted.

As described above, according to this embodiment, since target sound components included in noise bases factorized and separated by NMF are extracted and used as new target sound bases, the target sound can more accurately be reconstructed.

Second Embodiment

In the first embodiment, the matrix $H_E$ formed from bases concerning a target sound is generated from the matrix $H_N$ classified from the basis spectrum matrix H, and the target sound is reconstructed using the generated matrix $H_E$.

In this embodiment, a matrix $H_{FN}$ formed from bases concerning accurately reconstructed noise is generated from a matrix $H_N$ classified from a basis spectrum matrix H, and noise included in a sound pickup signal is suppressed using the generated matrix $H_{FN}$, thereby reconstructing a target sound.

An example of the functional arrangement of a sound processing apparatus according to this embodiment will be described first with reference to the block diagram of FIG. 4. The same reference numerals as in FIG. 1 denote the same functional units in FIG. 4, and a description thereof will be omitted.

A target sound component remover 101 refers to a noise frequency threshold obtained by a noise frequency threshold calculator 9, and generates, from the matrix $H_N$, the accurate noise basis spectrum matrix $H_{FN}$ that is a matrix obtained by suppressing target sound components.

A noise reconstructor 102 generates an accurate audio matrix of noise using the accurate noise basis spectrum matrix $H_{FN}$ and a matrix $U_N$. A spectrum subtracter 103 subtracts the accurate audio matrix of noise from an audio matrix of a sound pickup signal, thereby generating an accurate audio matrix of a target sound. The noise reconstructor 102 also converts each element of the audio matrix into a Fourier coefficient including phase information by applying a phase matrix to the audio matrix, like the target sound reconstructor 11.

An STIFT (Short-Time Inverse Fourier Transformer) 104 performs inverse Fourier transform on a frame basis for the accurate audio matrix of the target sound generated by the spectrum subtracter 103, and converts it into a time domain signal, thereby outputting an accurate target sound signal.

Figure 5:
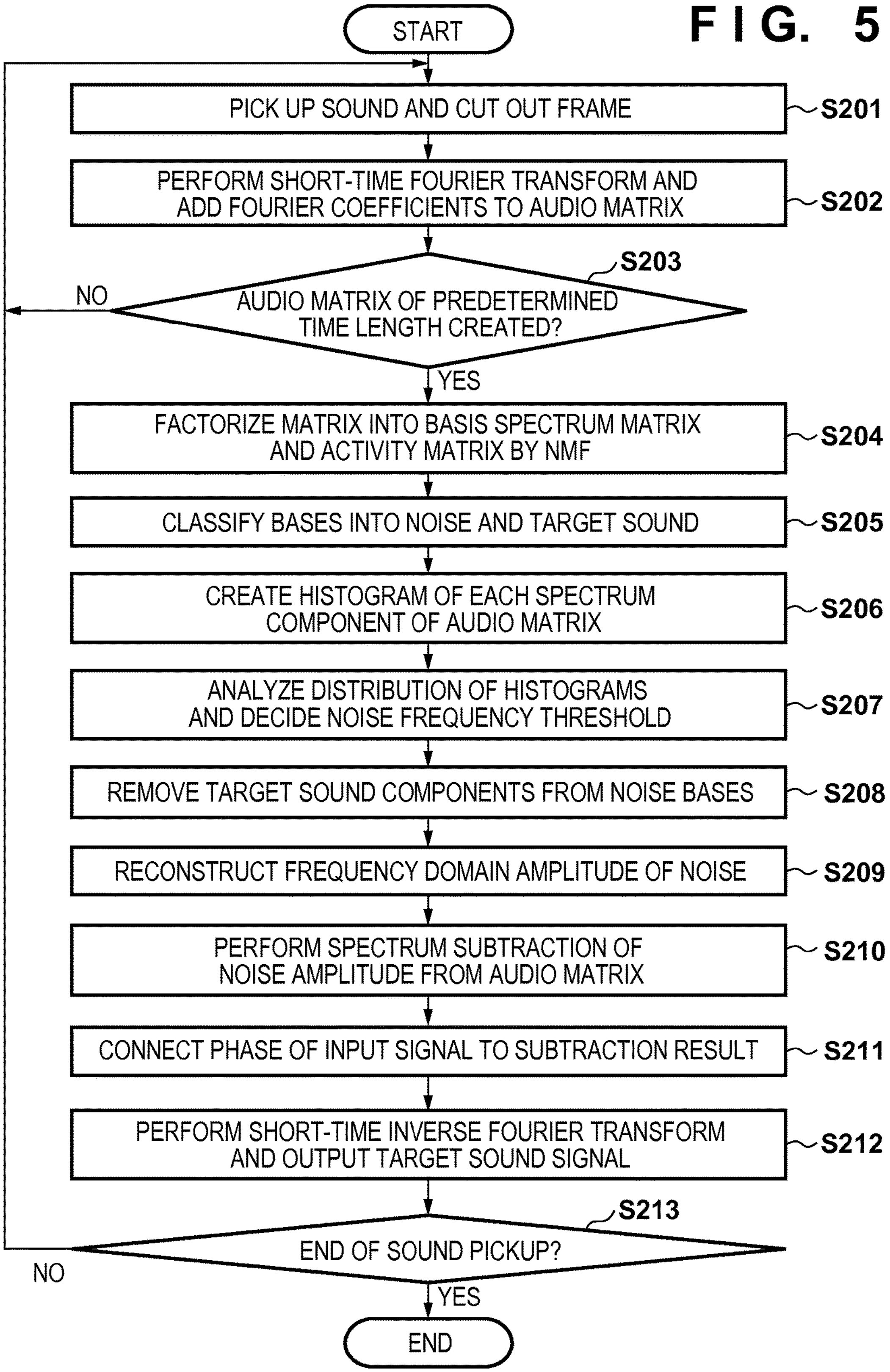
FIG. 5 is a flowchart of processing performed by the sound processing apparatus.

A series of operations performed by the sound processing apparatus having the above-described arrangement to accurately reconstruct the target sound while suppressing noise included in the sound pickup signal will be described next with reference to FIG. 5 that illustrates the flowchart of the processing. Note that the processes of steps S201 to S207 are the same as those of steps S1 to S7 of FIG. 2, and a description thereof will be omitted.

In step S208, the target sound component remover 101 refers to the noise frequency threshold decided in step S207, and generates, from the matrix $H_N$, the accurate noise basis spectrum matrix $H_{FN}$ that is a matrix obtained by suppressing target sound components.

In this step, for example, instead of generating a high-pass filter in step S101 of the flowchart shown in FIG. 3A, a low-pass filter having the noise frequency threshold as the cutoff frequency is generated. In step S103, the low-pass filter is applied to a selected basis spectrum to remove the target sound components (components in the high frequency band) from the basis spectrum, thereby generating the accurate noise basis spectrum matrix $H_{FN}$.

In step S209, the noise reconstructor 102 calculates the matrix product of the matrix $U_N$ and the accurate noise basis spectrum matrix $H_{FN}$ obtained in step S208, thereby obtaining an accurate audio matrix of noise. More specifically, letting $V_N$ be the accurate audio matrix of noise, the audio matrix $V_N$ is obtained by $$V_N = H_{FN} U_N \tag{3}$$

As indicated by equation (3), in this embodiment, since the more accurate basis spectrum matrix obtained by excluding the target sound components is used, a more accurate audio matrix of noise can be reconstructed.

In step S210, the spectrum subtracter 103 subtracts the audio matrix obtained in step S209 from the audio matrix of the sound pickup signal, thereby generating an accurate audio matrix of the target sound.

In step S211, the noise reconstructor 102 converts each element of the audio matrix into a Fourier coefficient including phase information by applying a phase matrix to the audio matrix generated in step S210, like the target sound reconstructor 11. The processes of steps S212 and S213 are the same as those of steps S11 and S12 of FIG. 2, and a description thereof will be omitted.

As described above, according to this embodiment, since target sound components are excluded from bases concerning noise, thereby accurately reconstructing the noise. For this reason, even when suppressing the reconstructed noise signal from an input signal, the noise can more accurately be suppressed.

Modifications of First and Second Embodiments

Figure 6:
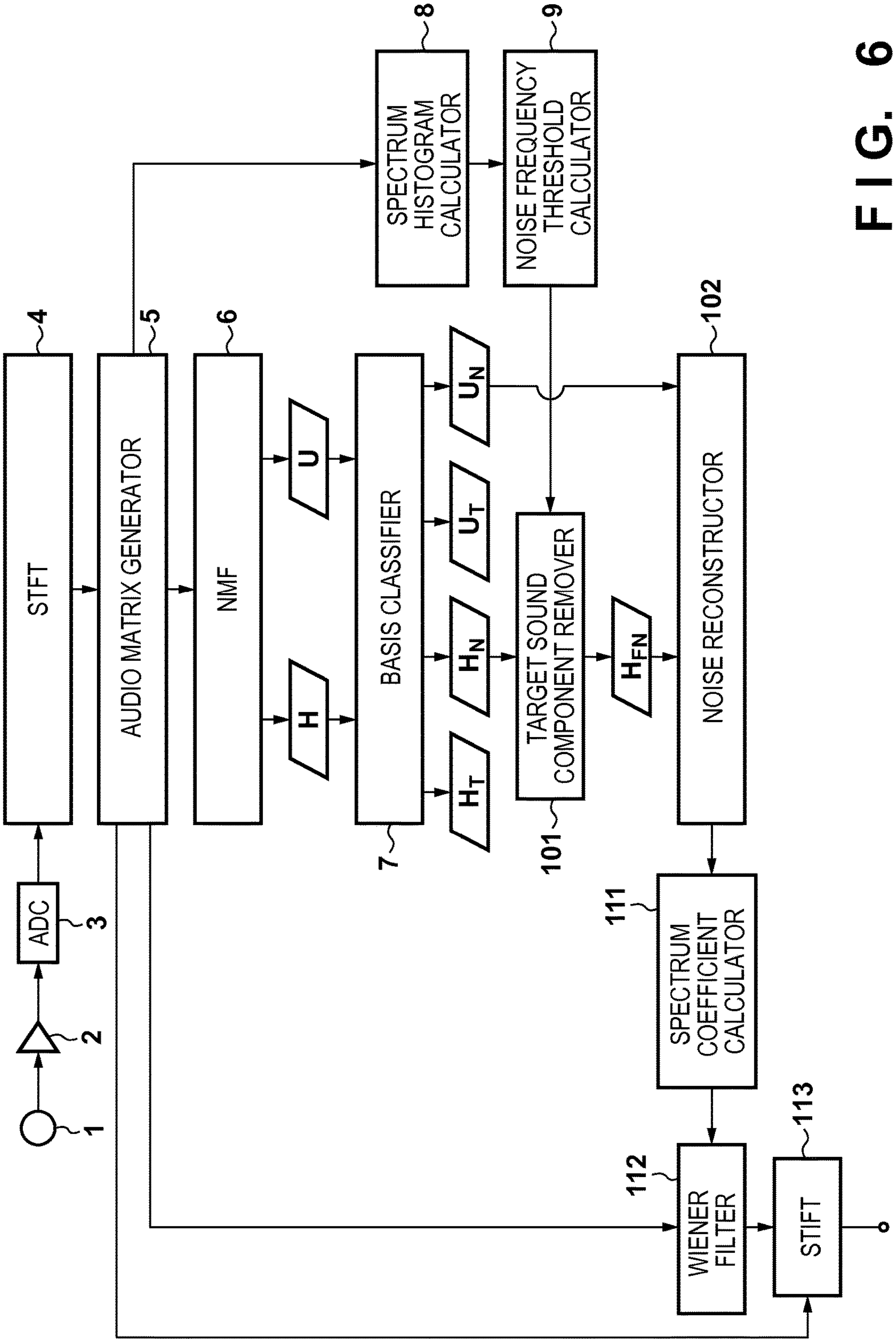
FIG. 6 is a block diagram showing an example of the functional arrangement of a sound processing apparatus.

The first and second embodiments have been described in detail using several detailed examples. However, the application targets of the above embodiments are not limited to the above detailed examples. For example, in the second embodiment, spectrum subtraction is used as the method of suppressing noise components included in a sound pickup signal using an accurate reconstructed noise signal obtained by excluding target sound components. This processing may be executed using a Wiener filter instead. FIG. 6 shows an example of the functional arrangement of a sound processing apparatus that suppresses a noise signal included in a sound pickup signal using a Wiener filter. The same reference numerals as in FIG. 4 denote the same functional units in FIG. 6, and a description thereof will be omitted.

A spectrum coefficient calculator 111 refers to the accurately reconstructed noise signal in the frequency domain generated by the noise reconstructor 102, weights the spectrum components so as to suppress the noise components, and designs a Wiener filter 112 using the weighting. When the Wiener filter 112 is applied to the audio matrix of the sound pickup signal, noise included in the sound pickup signal can accurately be suppressed.

In the above-described embodiments, the audio signal of the target sound is accurately reconstructed from the audio signal of a sound externally picked up. However, the audio signal of the target sound may accurately be reconstructed from an audio signal recorded in advance in a memory provided inside or outside of the apparatus.

Figure 4:
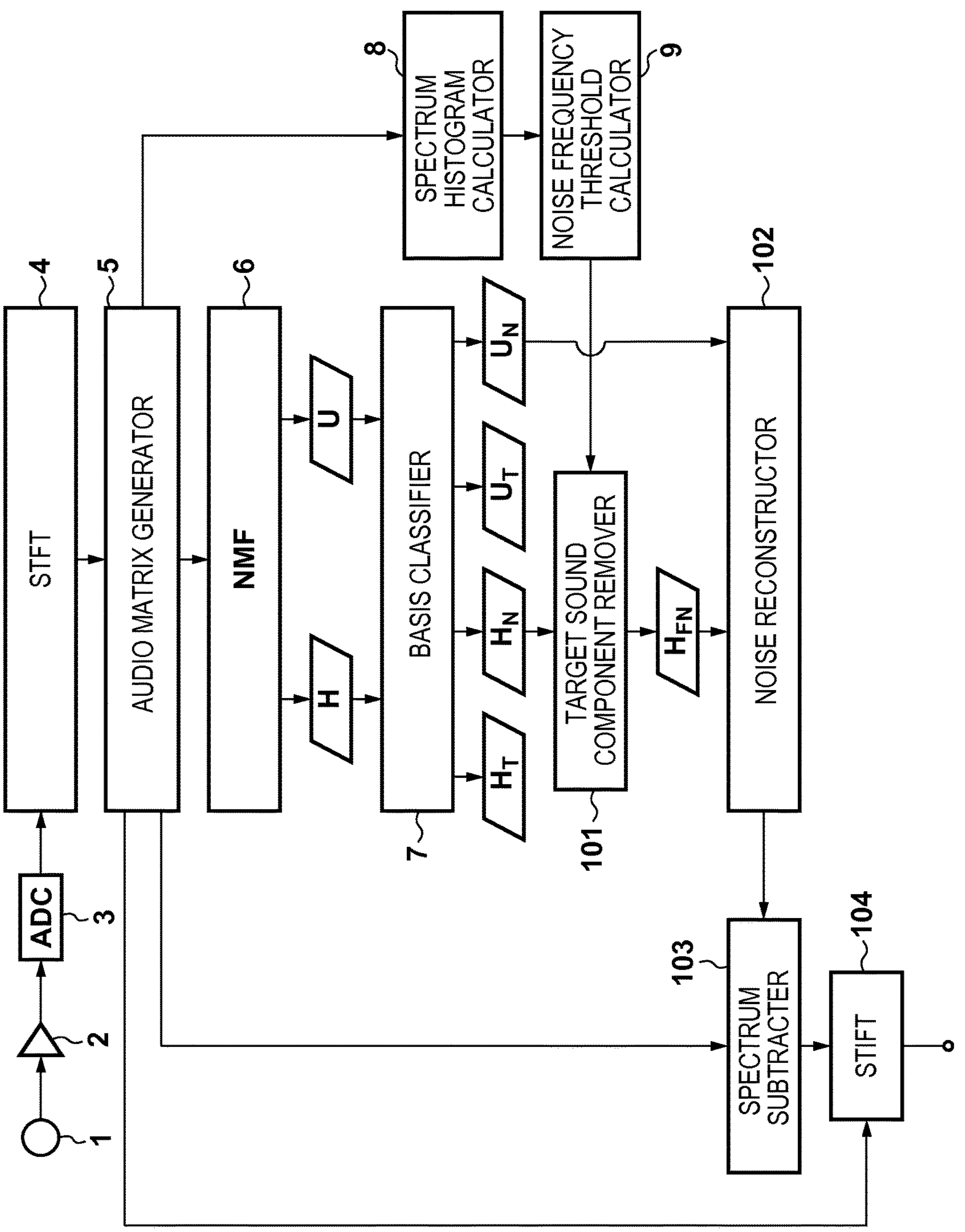
FIG. 4 is a block diagram showing an example of the functional arrangement of a sound processing apparatus.

The functional units shown in FIGS. 1, 4, and 6 may be formed from hardware. However, one or more functional units except the microphone unit 1, the microphone amplifier 2, and the ADC 3 may be implemented by software (computer program). In this case, a processor such as a CPU provided in the sound processing apparatus executes the computer program, thereby implementing the functions of the corresponding functional units.

In the first and second embodiments, Fourier transform is performed as frequency conversion. However, any other frequency transform methods may be used. Various embodiments and modifications described above may be used in combination as needed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-008859, filed Jan. 21, 2014, which is hereby incorporated by reference herein in its entirety.

What is claimed is:

1. A sound processing apparatus comprising:

one or more hardware processors; and a memory having stored thereon instructions which, when executed by the one or more hardware processors, cause the sound processing apparatus to:

generate an audio matrix formed from absolute amplitude values of coefficients obtained by frequency-transforming an audio signal that is a signal of an environment sound including a target sound;

perform non-negative matrix factorization for the audio matrix, thereby factorizing the audio matrix into a basis spectrum matrix and an activity matrix;

classify bases included in the basis spectrum matrix into bases concerning the target sound and bases concerning noise, and classify the activity matrix into activity rows corresponding to bases concerning the target sound and activity rows corresponding to bases concerning the noise;

perform a first calculation to obtain new bases concerning the target sound by separating specific frequency band components from the bases concerning the noise classified from the basis spectrum matrix;

perform a second calculation to obtain a matrix including frequency amplitude values of the target sound as elements using the bases concerning the target sound classified from the basis spectrum matrix, the activity rows corresponding to the bases concerning the target sound and the activity rows corresponding to the bases concerning the noise, and the bases concerning the target sound obtained by the first calculation; and generate the audio signal of the target sound using the matrix obtained by the second calculation, wherein the second calculation obtains, as the matrix including the frequency amplitude values of the target sound as the elements, a sum of (1) a matrix product of a matrix formed from the bases concerning the target sound classified from the basis spectrum matrix and a matrix formed from the activity rows corresponding to the bases concerning the target sound classified from the activity matrix and (2) a matrix product of a matrix formed from the activity rows corresponding to the bases concerning the noise classified from the activity matrix and a matrix formed from the bases concerning the target sound obtained by the first calculation.

2. The apparatus according to claim 1, wherein the instructions, when executed by the one or more hardware processors, further cause the sound processing apparatus to:

generate a histogram of a spectrum component of each row of the audio matrix;

obtain a boundary portion between a frequency band of the target sound and a frequency band of the noise as a threshold using the histogram; and obtain the bases concerning the target sound by applying a high-pass filter having the threshold as a cutoff frequency to the bases concerning the noise classified from the basis spectrum matrix.

3. The apparatus according to claim 1, wherein the first calculation specifies, from among columns of a matrix formed from the bases concerning the noise classified from the basis spectrum matrix, a column including components of the target sound, and obtains the bases concerning the target sound by applying, to the column, a high-pass filter having a cutoff frequency according to a spectrum component of the specified column.

4. A sound processing apparatus comprising:

one or more hardware processors; and a memory having stored thereon instructions which, when executed by the one or more hardware processors, cause the sound processing apparatus to:

generate an audio matrix formed from absolute amplitude values of coefficients obtained by frequency-transforming an audio signal that is a signal of an environment sound including a target sound;

perform non-negative matrix factorization for the audio matrix, thereby factorizing the audio matrix into a basis spectrum matrix and an activity matrix;

classify bases included in the basis spectrum matrix into bases concerning the target sound and bases concerning noise, and classify activity rows included in the activity matrix into activity rows corresponding to bases concerning the target sound and bases concerning the noise;

perform a first calculation to obtain bases for which components of a high frequency band of the bases are suppressed from the bases concerning the noise classified from the basis spectrum matrix;

perform a second calculation to obtain a matrix including frequency amplitude values of the noise as elements using the activity rows corresponding to the bases concerning the noise classified from the activity matrix and the bases obtained by the first calculation;

perform a third calculation to obtain a matrix including the frequency amplitude values of the target sound as elements using the audio matrix and the matrix obtained by the second calculation; and generate the audio signal of the target sound using the matrix obtained by the third calculation.

5. The apparatus according to claim 4, wherein the first calculation:

generates a histogram of a spectrum component of each row of the audio matrix;

obtains a boundary portion between a frequency band of the target sound and a frequency band of the noise as a threshold using the histogram; and applies a low-pass filter having the threshold as a cutoff frequency to the bases concerning the noise classified from the basis spectrum matrix.

6. The apparatus according to claim 4, wherein the second calculation obtains, as the matrix including the frequency amplitude values of the noise as the elements, a matrix product of a matrix formed from the activity rows concerning the noise classified from the activity matrix and a matrix formed from the bases obtained by the first calculation.

7. The apparatus according to claim 4, wherein the third calculation obtains the matrix including the frequency amplitude values of the target sound as the elements by subtracting the matrix obtained by the second calculation.

8. A sound processing method performed by a sound processing apparatus, comprising:

generating an audio matrix formed from absolute amplitude values of coefficients obtained by frequency-transforming an audio signal that is a signal of an environment sound including a target sound;

performing non-negative matrix factorization for the audio matrix, thereby factorizing the audio matrix into a basis spectrum matrix and an activity matrix;

classifying bases included in the basis spectrum matrix into bases concerning the target sound and bases concerning noise, and classifying the activity matrix into activity rows corresponding to bases concerning the target sound and activity rows corresponding to bases concerning the noise;

performing a first calculation to obtain new bases concerning the target sound by separating specific frequency band components from the bases concerning the noise classified from the basis spectrum matrix;

performing a second calculation to obtain a matrix including frequency amplitude values of the target sound as elements using the bases concerning the target sound classified from the basis spectrum matrix, the activity rows corresponding to the bases concerning the target sound, the activity rows corresponding to the bases concerning the noise classified from the activity matrix, and the obtained new bases concerning the target sound; and generating the audio signal of the target sound using the obtained matrix including frequency amplitude values of the target sound as elements, wherein the second calculation obtains, as the matrix including the frequency amplitude values of the target sound as the elements, a sum of (1) a matrix product of a matrix formed from the bases concerning the target sound classified from the basis spectrum matrix and a matrix formed from the activity rows corresponding to the bases concerning the target sound classified from the activity matrix and (2) a matrix product of a matrix formed from the activity rows corresponding to the bases concerning the noise classified from the activity matrix and a matrix formed from the bases concerning the target sound obtained by the first calculation.

9. A sound processing method performed by a sound processing apparatus, comprising:

generating an audio matrix formed from absolute amplitude values of coefficients obtained by frequency-transforming an audio signal that is a signal of an environment sound including a target sound;

performing non-negative matrix factorization for the audio matrix, thereby factorizing the audio matrix into a basis spectrum matrix and an activity matrix;

classifying bases included in the basis spectrum matrix into bases concerning the target sound and bases concerning noise, and classify activity rows included in the activity matrix into bases concerning the target sound and activity rows corresponding to bases concerning the noise;

obtaining bases for which components of a high frequency band of the bases are suppressed from the bases concerning the noise classified from the basis spectrum matrix;

obtaining a matrix including frequency amplitude values of the noise as elements using the activity rows corresponding to the bases concerning the noise classified from the activity matrix and the obtained bases for which components of the high frequency band of the bases are suppressed from the bases concerning the noise classified from the basis spectrum matrix;

obtaining a matrix including the frequency amplitude values of the target sound as elements using the audio matrix and the obtained matrix including frequency amplitude values of the noise as elements; and generating the audio signal of the target sound using the obtained matrix including the frequency amplitude values of the target sound as elements.

10. A non-transitory computer-readable storage medium storing a computer program that causes a computer to:

generate an audio matrix formed from absolute amplitude values of coefficients obtained by frequency-transforming an audio signal that is a signal of an environment sound including a target sound;

perform non-negative matrix factorization for the audio matrix, thereby factorizing the audio matrix into a basis spectrum matrix and an activity matrix;

classify bases included in the basis spectrum matrix into bases concerning the target sound and bases concerning noise, and classify the activity matrix into activity rows corresponding to bases concerning the target sound and activity rows corresponding to bases concerning the noise;

perform a first calculation to obtain new bases concerning the target sound by separating specific frequency band components from the bases concerning the noise classified from the basis spectrum matrix;

perform a second calculation to obtain a matrix including frequency amplitude values of the target sound as elements using the bases concerning the target sound classified from the basis spectrum matrix, the activity rows corresponding to the bases concerning the target sound and the activity rows corresponding to the bases concerning the noise classified from the activity matrix, and the obtained new bases concerning the target sound; and generate the audio signal of the target sound using the obtained matrix including frequency amplitude values of the target sound as elements, wherein the second calculation obtains, as the matrix including the frequency amplitude values of the target sound as the elements, a sum of (1) a matrix product of a matrix formed from the bases concerning the target sound classified from the basis spectrum matrix and a matrix formed from the activity rows corresponding to the bases concerning the target sound classified from the activity matrix and (2) a matrix product of a matrix formed from the activity rows corresponding to the bases concerning the noise classified from the activity matrix and a matrix formed from the bases concerning the target sound obtained by the first calculation.

11. A non-transitory computer-readable storage medium storing a computer program that causes a computer to:

generate an audio matrix formed from absolute amplitude values of coefficients obtained by frequency-transforming an audio signal that is a signal of an environment sound including a target sound;

perform non-negative matrix factorization for the audio matrix, thereby factorizing the audio matrix into a basis spectrum matrix and an activity matrix;

classify bases included in the basis spectrum matrix into bases concerning the target sound and bases concerning noise, and classify activity rows included in the activity matrix into activity rows corresponding to bases concerning the target sound and activity rows corresponding to bases concerning the noise;

obtain bases for which components of a high frequency band of the bases are suppressed from the bases concerning the noise classified from the basis spectrum matrix;

obtain a matrix including frequency amplitude values of the noise as elements using the activity rows corresponding to bases concerning the noise classified from the activity matrix and the obtained bases for which components of the high frequency band of the bases are suppressed from the bases concerning the noise classified from the basis spectrum matrix;

obtain a matrix including the frequency amplitude values of the target sound as elements using the audio matrix and the obtained matrix including frequency amplitude values of the noise as elements; and generate the audio signal of the target sound using the obtained matrix including the frequency amplitude values of the target sound as elements.

* * * * *